US010037612B2

(12) United States Patent
Kwak et al.

(10) Patent No.: US 10,037,612 B2
(45) Date of Patent: Jul. 31, 2018

(54) THREE DIMENSIONAL DATA ACQUISITION WITH ORTHOGONAL COMPOSITE PATTERN FOR STRUCTURED LIGHT ILLUMINATED VISION

(71) Applicant: Empire Technology Development LLC, Wilmington, DE (US)

(72) Inventors: Jin Sam Kwak, Ulwang-si (KR); Geonjung Ko, Suwon-si (KR); Hyun Oh Oh, Seongnam-si (KR); Ju Hyung Son, Ulwang-si (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 205 days.

(21) Appl. No.: 14/980,692

(22) Filed: Dec. 28, 2015

(65) Prior Publication Data
US 2017/0186184 A1    Jun. 29, 2017

(51) Int. Cl.
*G06T 7/60*  (2017.01)
*G01B 11/25* (2006.01)

(52) U.S. Cl.
CPC .......... *G06T 7/60* (2013.01); *G01B 11/2513* (2013.01); *G06T 2207/20056* (2013.01)

(58) Field of Classification Search
CPC .......... G06T 7/60; G06T 2207/20056; G01B 11/2513
USPC ........................................ 348/136
See application file for complete search history.

(56) References Cited

U.S. PATENT DOCUMENTS

| 4,965,840 | A | * | 10/1990 | Subbarao | G01C 3/085 356/12 |
| 6,229,913 | B1 | * | 5/2001 | Nayar | G02B 27/2278 250/201.4 |
| 7,844,079 | B2 | | 11/2010 | Hassebrook et al. | |
| 2008/0279446 | A1 | * | 11/2008 | Hassebrook | G01B 11/2513 382/154 |
| 2010/0271461 | A1 | * | 10/2010 | Takizuka | H04N 13/0029 348/43 |
| 2015/0015691 | A1 | * | 1/2015 | Forman | A61B 5/7292 348/77 |
| 2015/0330775 | A1 | * | 11/2015 | Basevi | G01B 11/254 348/136 |

OTHER PUBLICATIONS

Guan, C., et al., "Composite structured light pattern for three dimensional video," Optics Express, vol. 11, No. 5, pp. 406-417 (2003).

(Continued)

*Primary Examiner* — Nguyen Truong

(57) ABSTRACT

Technologies are generally described for phase measuring profilometry (PMP) using structured light patterns based on orthogonal frequency division multiplexing (OFDM). In some examples, a composite structured light pattern generated using OFDM may be used to illuminate a surface of interest. The surface may reflect a phase-distorted version of the structured light pattern, and the phase-distorted structured light pattern may be processed to recover image and/or height information about the surface. In some embodiments, fast Fourier transform schemes may be used to generate the composite structured light pattern and process the phase-distorted structured light pattern.

20 Claims, 9 Drawing Sheets

(56) References Cited

OTHER PUBLICATIONS

Shen, Y. and Zheng, H.R., "Influence of sampling on face measuring system based on composite structured light," J. Biomedical Science and Engineering, vol. 2, No. 8, pp. 606-611 (2009).

* cited by examiner

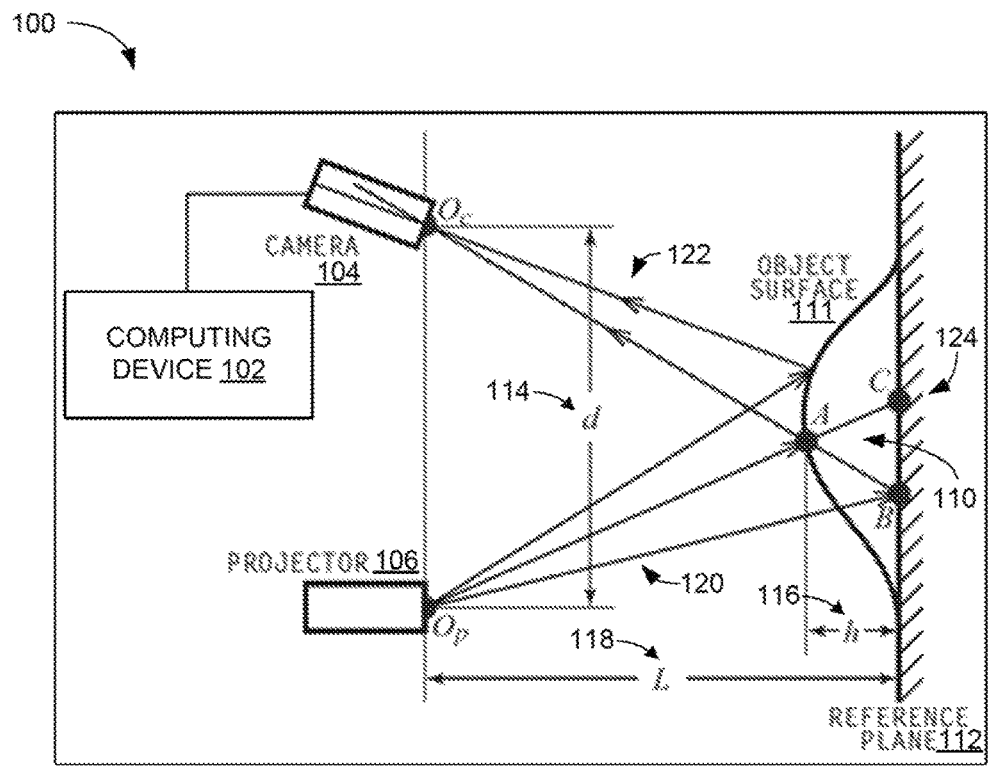
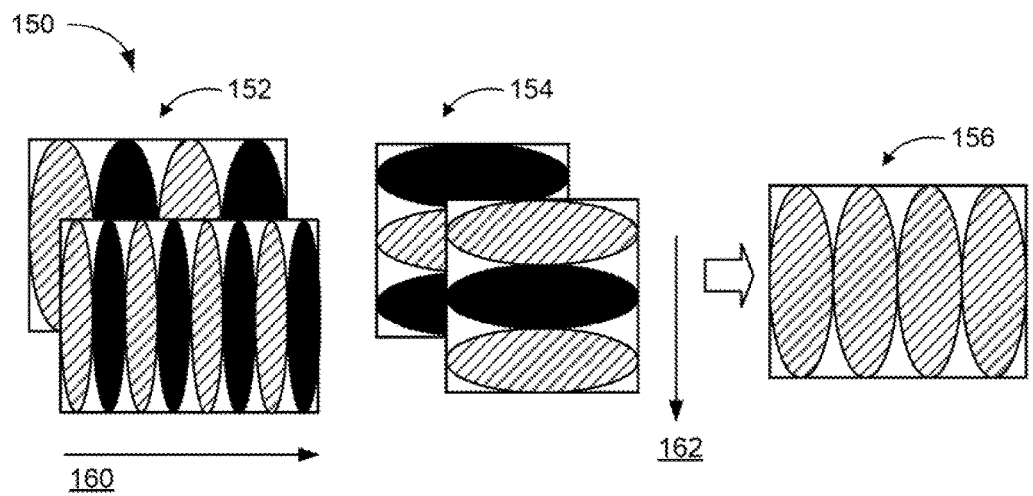
FIG. 1

US 10,037,612 B2

THREE DIMENSIONAL DATA ACQUISITION WITH ORTHOGONAL COMPOSITE PATTERN FOR STRUCTURED LIGHT ILLUMINATED VISION

BACKGROUND

Unless otherwise indicated herein, the materials described in this section are not prior art to the claims in this application and are not admitted to be prior art by inclusion in this section.

Structured light illumination, or SLI, is often used for noncontact surface scanning methods in machine vision because of its high accuracy and scalability. SLI involves projecting a structured pattern of light onto a target surface and recording the reflection of the structured light pattern from the target surface. The topology of the target surface may affects how the structured light pattern is reflected, and three-dimensional data about the target surface topology can then be extracted from the reflected structured light pattern.

SUMMARY

According to some examples, a computing device capable to provide three dimensional data acquisition with orthogonal composite patterns for structured light illumination vision is provided. The computing device may include a networking component, a memory, and one or more processors. The memory may be configured to store instructions associated with a vision analysis application. The processors may be capable to execute the vision analysis application in conjunction with instructions stored in the memory. The vision analysis application may include a detector module and an analysis module. The detector module may be configured to prompt, through the networking component, a light source to illuminate a surface of an object with a first structured light pattern, and receive, through the networking component, a second structured light pattern image reflected from the surface of the object. The analysis module may be configured to process the second structured light pattern image using orthogonal frequency division multiplexing (OFDM) and generate three dimensional data associated with the object from the processed second structured light pattern image.

According to other examples, a method to provide three dimensional data acquisition with orthogonal composite patterns for structured light illumination vision is provided. The method may include prompting a light source to illuminate a surface of an object with a first phase measuring profilometry (PMP) structured light pattern, receiving a second PMP structured light pattern image reflected from the surface of the object, processing the second PMP structured light pattern image using orthogonal frequency division multiplexing (OFDM), and generating three dimensional data associated with the object from the processed second PMP structured light pattern image.

According to further examples, an object detection system capable to provide three dimensional data acquisition with orthogonal composite patterns for structured light illuminated vision is provided. The object detection system may include a camera, a light source, a memory configured to store instructions associated with a vision analysis application, and one or more processors coupled to the memory and capable to execute the vision analysis application. The vision analysis application may be configured to prompt the light source to illuminate a surface of an object with a first phase measuring profilometry (PMP) structured light pattern and receive a second PMP structured light pattern image reflected from the surface of the object and captured by the camera. The vision analysis application may further be configured to process the second PMP structured light pattern image using orthogonal frequency division multiplexing (OFDM) and generate three dimensional data associated with the object from the processed second PMP structured light pattern image.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

FIG. 1 illustrates an example high level diagram of a system configured to provide three dimensional data acquisition with orthogonal composite structured light patterns for structured light illuminated vision;

DETAILED DESCRIPTION

Figure 2:
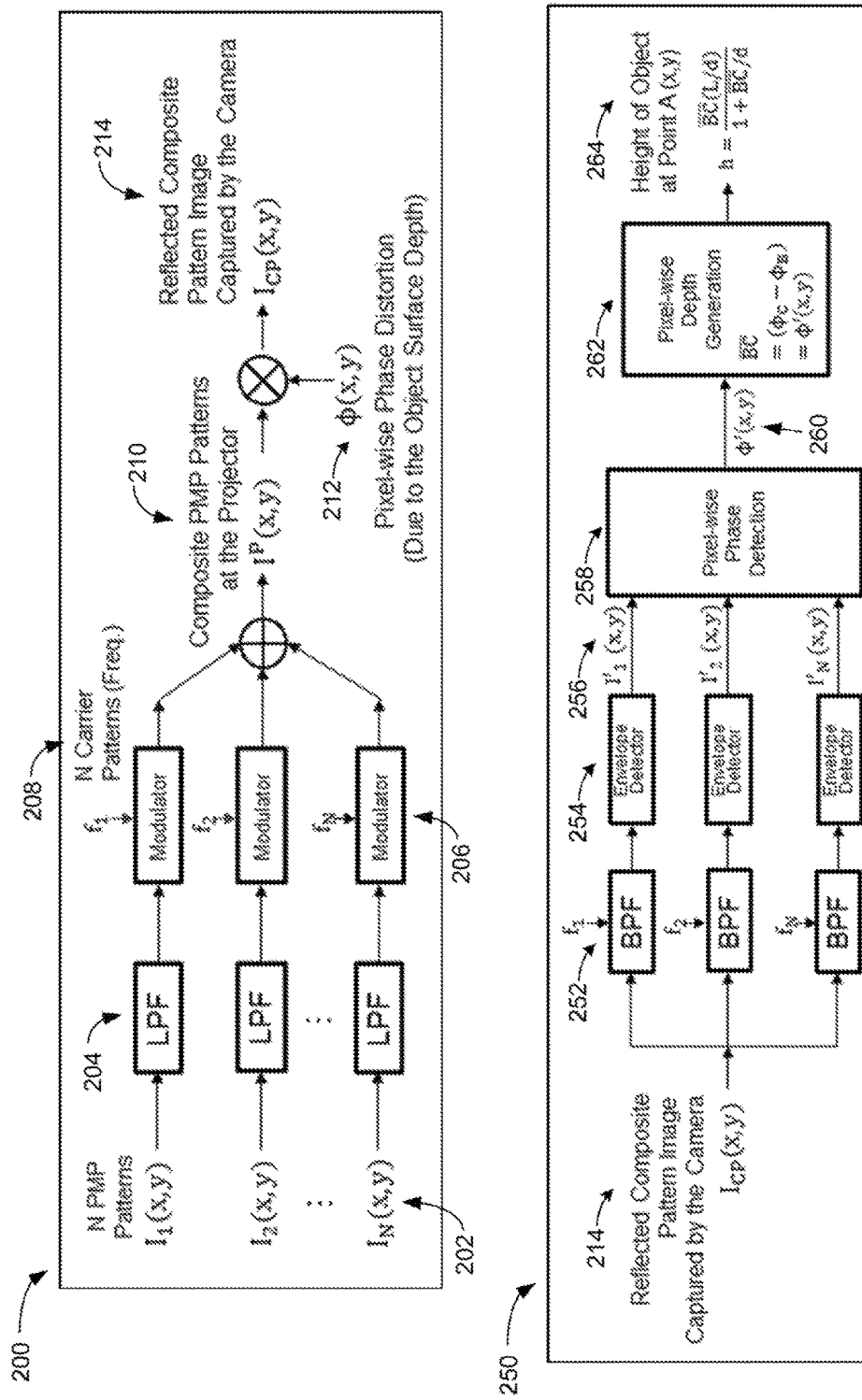
FIG. 2 illustrates a scheme to provide three dimensional data associated with an object.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Briefly stated, technologies are generally described for phase measuring profilometry (PMP) using structured light patterns based on orthogonal frequency division multiplexing (OFDM). A composite structured light pattern generated using OFDM may be used to illuminate a surface of interest. The surface may reflect a phase-distorted version of the structured light pattern, and the phase-distorted structured light pattern may be processed to recover image and/or height information about the surface. In some embodiments, fast Fourier transform schemes may be used to generate the composite structured light pattern and process the phase-distorted structured light pattern.

FIG. 1 illustrates an example high level diagram of a system configured to provide three dimensional data acquisition with orthogonal composite structured light patterns for structured light illuminated vision, arranged in accordance with at least some embodiments described herein.

As described above, structured light illumination, often used for noncontact surface scanning, involves projection of a structured pattern of light onto a target surface and recording the reflection of the structured light pattern from the target surface. Three-dimensional data that describes the topology of the target surface may then be extracted from the reflected structured light pattern. Multiple structured light patterns may be used in order to provide more detailed information about surface topology. For example, multiple structured light patterns may be generated based on phase-shifting techniques such as phase measuring profilometry (PMP). Such structured light patterns may also be interchangeably referred to herein as "PMP structured light patterns" or "PMP patterns". In some embodiments, multiple PMP structured light patterns may be combined into a single composite structured light pattern (also referred to herein as a "composite PMP pattern" or a "composite pattern") for real-time surface measurement.

As shown in a diagram 100, a projector 106 may be configured to project a first structured light pattern 120 toward an object 110, where the object 110 is positioned on a reference plane 112. The first structured light pattern 120 may be reflected by a surface 111 of the object 110, forming a reflected second structured light pattern image 122. A camera 104 may then capture the second structured light pattern image 122 and provide the captured second structured light pattern image 122 to a computing device 102. The computing device 102 may use the second structured light pattern image 122, the first structured light pattern 120, a distance 114 that is a measurement of separation or distance between the camera 104 and the projector 106, and a distance 118 that is a measurement of separation or distance between the projector 106/camera 104 and the reference plane 112 to determine depth or height measurements associated with the surface 111 and the reference plane 112. For example, the computing device 102 may first compute an expected reflection of the first structured light pattern 120 from the reference plane 112 assuming the absence of any object on the reference plane 112. The computing device 102 may then determine deviations between the second structured light pattern image 122 and the computed expected reflection at one or more points on the reference plane 112 and the surface 111, and may then use the deviations to determine a height 116 of the surface 111 with respect to the reference plane 112.

In some embodiments, the first structured light pattern 120 may be a composite structured light pattern that includes multiple PMP patterns in order to provide more detailed information about the surface 111. According to a diagram 150, a composite pattern 156 may be formed by multiplying multiple, different carrier patterns 152 with multiple PMP patterns 154. Each of the carrier patterns 152 may vary sinusoidally along an orthogonal direction 160 with a different frequency, and each of the PMP patterns 154 may have a different intensity characteristic that varies along a phase direction 162. In some embodiments, each of the carrier patterns 152 may be multiplied by a corresponding one of the PMP patterns 154 to form a modulated PMP pattern. The modulated PMP patterns may then be combined, for example, by superimposing the modulated PMP patterns, to form the composite pattern 156, which may be used as a structured light pattern by the projector 106 such as the first structured light pattern 120.

FIG. 2 illustrates a scheme to provide three dimensional data associated with an object, arranged in accordance with at least some embodiments described herein.

As described above, composite structured light patterns used to determine three dimensional information about a surface may be formed by multiplying different carrier patterns with different PMP patterns, similar to how frequency division multiplexing (FDM) occurs. According to a first diagram 200 that depicts how a composite PMP pattern may be generated, multiple PMP patterns 202, each of which may have an intensity characteristic that varies along a phase direction as described above, may first be filtered through low-pass filters 204. The filtered PMP patterns may then be modulated with carrier patterns 208 by modulators 206 to form modulated PMP patterns. Each of the carrier patterns in the carrier patterns 208 may vary sinusoidally along an orthogonal direction with a different frequency $f_1, f_2, \ldots, f_N$, and may be used to modulate a respective one of the filtered PMP patterns. The modulated PMP patterns may then be combined to form one or more composite PMP patterns 210, which may then be projected toward a surface or object. The surface or object may then reflect the composite PMP patterns 210 according to its surface topology, in effect distorting the phases of the composite PMP patterns 210 based on surface topology variations, to form a reflected composite pattern image 214. The reflected composite pattern image 214 may then be captured by a camera.

According to a second diagram 250 that depicts how a reflected composite PMP pattern may be decoded, the reflected composite pattern image 214 may be provided to multiple band-pass filters 252 and subsequent envelope detectors 254 to recover multiple filtered PMP patterns 256. In some embodiments, each of the band-pass filters 252 may have a different center frequency that corresponds to a respective one of the carrier patterns 208, and accordingly may recover a filtered PMP pattern that corresponds to the PMP pattern modulated with the respective carrier pattern. The recovered filtered PMP patterns 256 may then be provided to a pixel-wise phase detection module 258, which may be configured to compute a pixel-wise phase distortion 260 associated with each of the filtered PMP patterns 256. The computed pixel-wise phase distortion 260 may then be provided to a pixel-wise depth generation module 262, which may be configured to generate object height data 264 based on the computed pixel-wise phase distortion 260.

Figure 3:
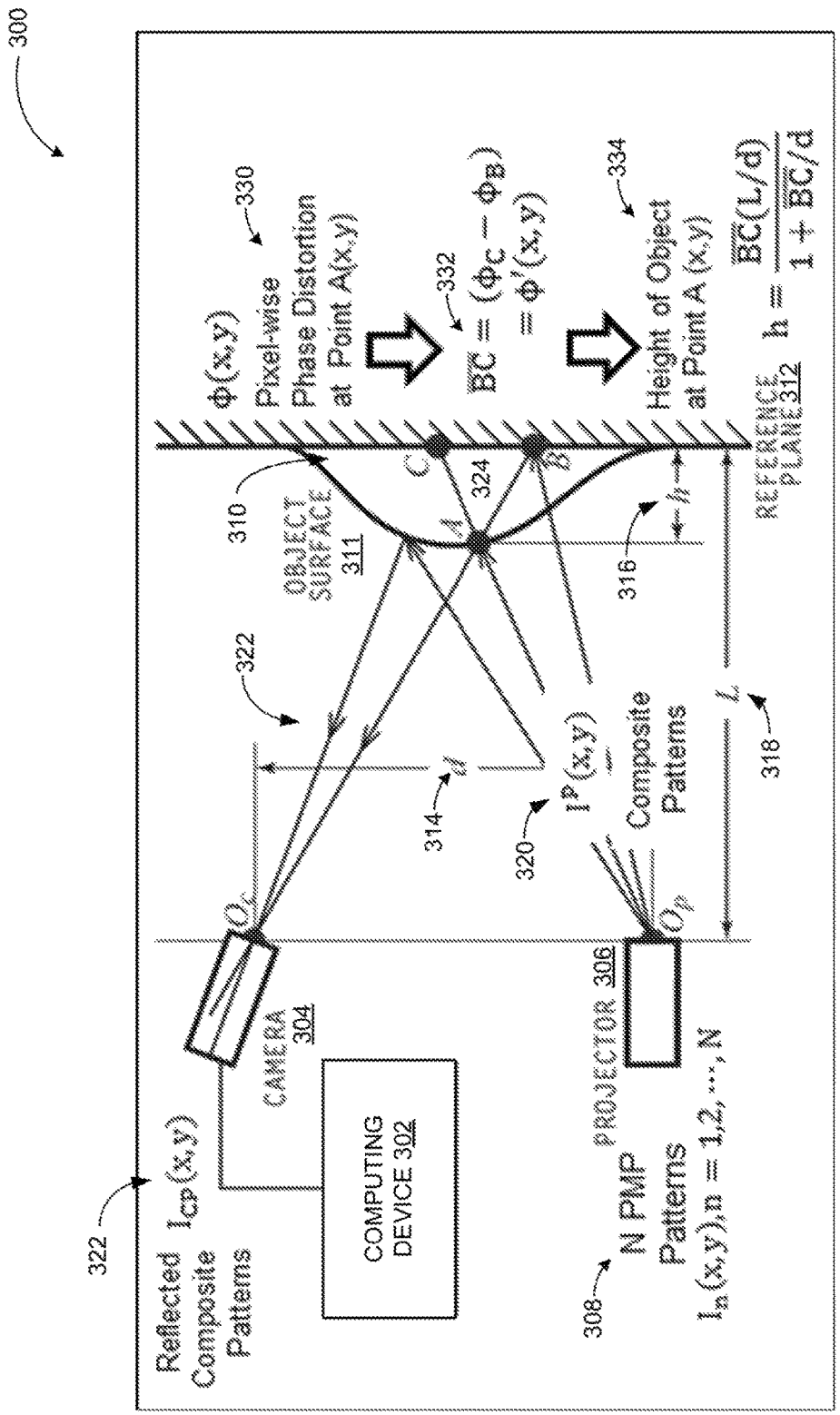
FIG. 3 illustrates components of a system providing three dimensional data acquisition with orthogonal composite structured light patterns for structured light illuminated vision.

FIG. 3 illustrates components of a system providing three dimensional data acquisition with orthogonal composite structured light patterns for structured light illuminated vision, arranged in accordance with at least some embodiments described herein.

As shown in a diagram 300, a projector 306 may be configured to project a first structured light pattern 320 toward an object 310 positioned on a reference plane 312. The first structured light pattern 320 may include one or more composite PMP patterns formed from multiple PMP patterns 308 as described above in FIG. 2. In some embodiments, the PMP patterns 308 may include N patterns, where N is greater than 3, in order to enable whole-field pixel-wise depth calculation. The patterns may be phase shifted by a factor of $$\frac{2\pi}{N},$$

and each pattern may be defined as:

$$I_n(x, y) = A + B\cos\left(2\pi fy - \frac{2\pi n}{N}\right),$$

where A and B may be projector constants and (x,y) may represent the projector coordinates or the coordinates of the pattern defined with respect to the reference plane 312. They dimension may be defined as the direction of the depth distortion, or the phase dimension. The x dimension may be defined as the orthogonal dimension, perpendicular to the phase dimension. The frequency f may denote a center frequency of sinusoidal waves in the phase direction. In some embodiments, the composite PMP pattern(s) in the first structured light pattern 320 may then be expressed as the following:

$$I^P(x,y) = A + B \sum_{n=1}^{N} I_n(x,y)\cos(2\pi f_n x),$$

where $f_n$ may represent the n-th carrier frequency for the n-th PMP pattern.

The first structured light pattern 320 with the composite PMP pattern(s) may then be reflected by a surface 311 of the object 310, forming a reflected second structured light pattern image 322 which may then be captured by a camera 304 and provided to a computing device 302. The computing device 302 may then use the second structured light pattern image 322, the first structured light pattern 320, a distance d 314 separating the camera 304 and the projector 306, and a distance L 318 between the projector 306/camera 304 and the reference plane 312 to determine depth or height measurements associated with the object surface 311 and the reference plane 312. In some embodiments, the reflected second structured light pattern image 322 may include a phase-distorted version of the composite PMP pattern(s) in the first structured light pattern 320, which may be expressed as:

$$I_{CP}(x, y) = \alpha(x, y)\left[A + B\sum_{n=1}^{N} I'_n(x, y)\cos(2\pi f_n x)\right]$$

$I'_n(x,y)$ may represent individual phase-distorted patterns, and may be defined as:

$$I'_n(x, y) = \alpha(x, y)\left[A + B\cos\left(2\pi fy + \varphi(x, y) - \frac{2\pi n}{N}\right)\right],$$

where $\alpha(x,y)$ may represent the reflectance variation or the albedo at the coordinates (x,y) and $\varphi(x,y)$ may be pixel-wise phase distortion at the coordinates (x,y) and may correspond to the object surface depth at the coordinates (x,y). In some embodiments, the computing device 302 may determine a computed pixel-wise phase distortion $\varphi'(x,y)$ 330 using the following equation:

$$\varphi'(x, y) = \arctan\left[\frac{\sum_{n=1}^{N} I'_n(x, y)\sin\left(\frac{2\pi n}{N}\right)}{\sum_{n=1}^{N} I'_n(x, y)\cos\left(\frac{2\pi n}{N}\right)}\right]$$

Subsequently, the computing device 302 may use geometric algorithms to calculate pixel-wise height data for the object surface. For example, the computing device 302 may use depth information for points 324 to compute a height h 316 of one of the points (point A) 324 with respect to the reference plane 312 using the following:

$$h = \frac{\overline{BC}(L/d)}{1 + \overline{BC}/d}(334) \text{ with } \overline{BC} = \beta(\varphi_C - \varphi_B) = \varphi'(x, y)(332),$$

where $\beta$ may represent a scaling factor for converting the phase difference into the length between virtual points B and C in the points 324.

As depicted above in FIG. 2, large numbers of elements such as low-pass filters (LPF) 204, band-pass filters (BPF) 252, and envelope detectors 254 may be necessary to generate and decode composite PMP patterns using FDM as described above. Moreover, FDM may require that local oscillators at a structured light pattern projector (for example, the projector 306) and a camera capturing reflected structured light patterns (for example, the camera 304) be relatively well-aligned, which may imply that accurate and intensive epipolar rectification may be necessary. In addition, frequency harmonics should be filtered out in order to recover reflected PMP patterns and avoid spurious carrier frequency interference, and the filtering process may be computationally inefficient.

In some embodiments, orthogonal frequency division multiplexing (OFDM) may be used to implement multiple carrier frequency patterns instead of FDM. In these embodiments, multiple PMP patterns may be mapped into multiple subcarriers generated from a carrier with a single center frequency.

Figure 4:
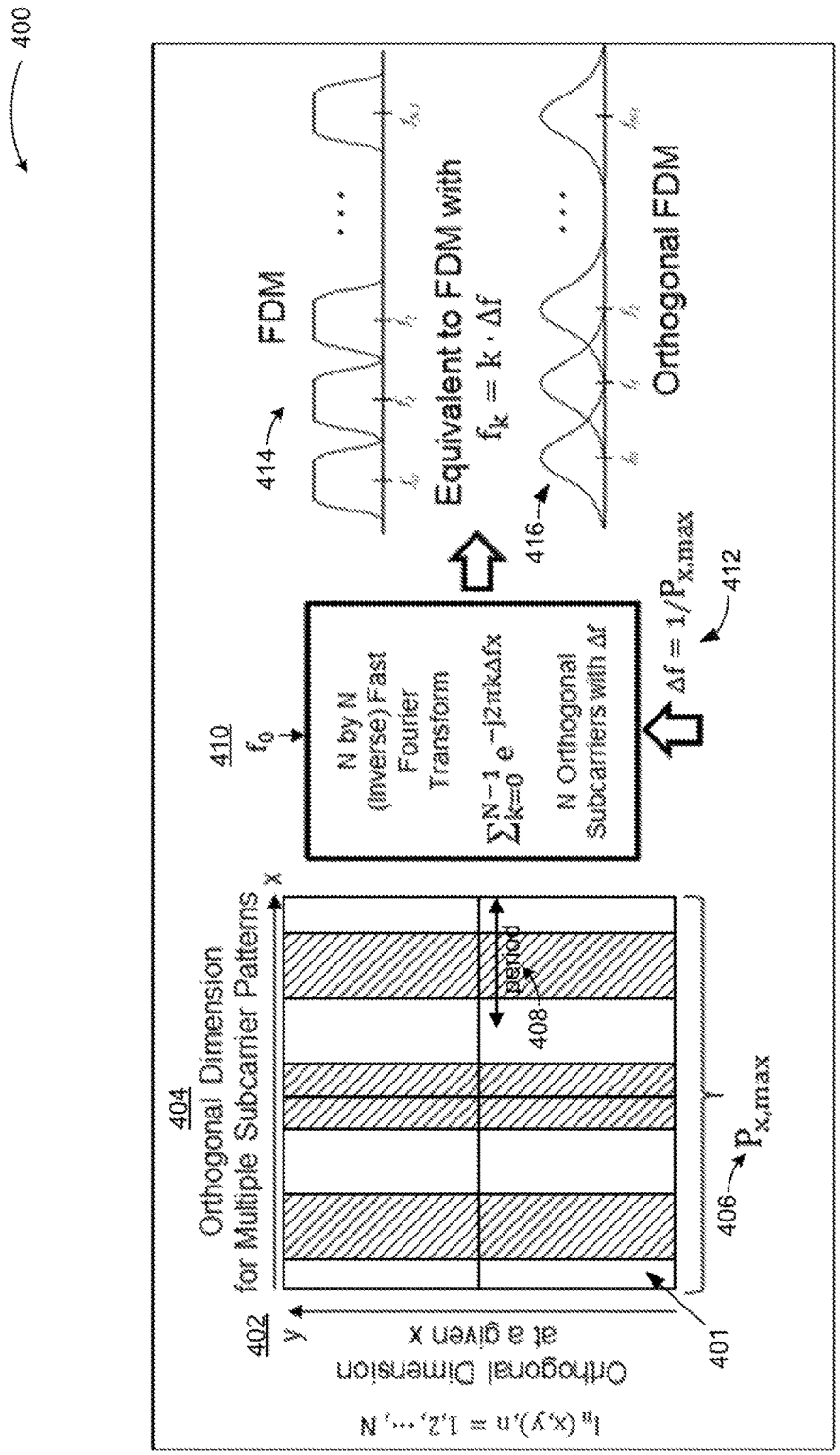
FIG. 4 illustrates example scenarios of providing three dimensional data acquisition with orthogonal composite structured light patterns for structured light illuminated vision.

FIG. 4 illustrates example scenarios of providing three dimensional data acquisition with orthogonal composite structured light patterns for structured light illuminated vision, arranged in accordance with at least some embodiments described herein.

According to a diagram 400, N PMP patterns may be processed with a single carrier pattern 401, instead of with multiple carrier patterns such as the carrier patterns 152. The carrier pattern 401 may have an orthogonal dimension 402 corresponding to the y or phase dimension of a PMP pattern, and another orthogonal dimension 404 corresponding to the x or orthogonal direction (for example, the orthogonal direction 160 of the carrier patterns 152). The carrier pattern 401 may have a center frequency $f_0$ 410 and a size of $P_{x,max}$ and a period 408 along the orthogonal dimension 404. $P_{x,max}$ may correspond to the size of the target projected/captured image at the projector/camera, or alternately to the maximum number of pixels or samples in the orthogonal dimension 404. In some embodiments, multiple subcarrier patterns may be generated from the carrier pattern 401, where a subcarrier spacing 412 between the different subcarriers may be defined as:

$$\Delta f = \frac{1}{P_{x,max}}$$

An N by N fast Fourier transform (FFT) or inverse FFT may then be used to process the N PMP patterns based on the center frequency $f_0$ 410 and the subcarrier spacing $\Delta f$ 412:

$$\sum_{k=0}^{N-1} e^{-j2\pi k \Delta f x}$$

in effect combining the PMP patterns with carrier patterns having an OFDM spectrum 416. The OFDM spectrum 416 may be similar to an FDM spectrum 414 having carrier frequencies $f_k = k \cdot \Delta f$, where $f_k$ is the k-th center frequency. The OFDM spectrum 416 may provide some benefit over the FDM spectrum 414 because of decreased implementation complexity. For example, implementations based on FDM may require that each frequency band have low-pass/band-pass filters and associated oscillator banks at the projector and the camera. In addition, the filters must be able to handle relatively sharp transitions, evident in the FDM spectrum 414. In contrast, using FFT/inverse FFT may allow the complexity of signal generation and decoding to be reduced.

Figure 5:
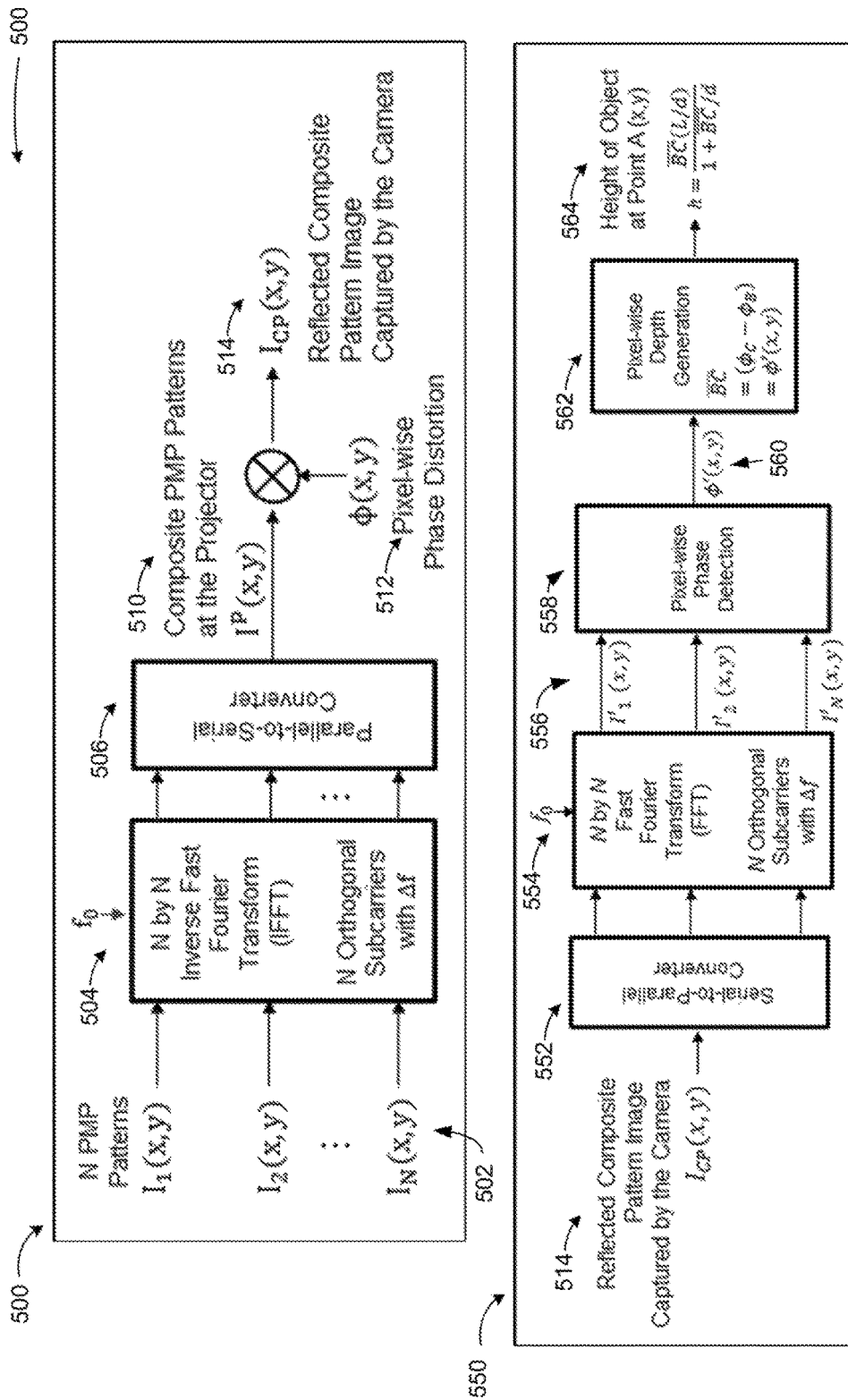
FIG. 5 illustrates components of a scheme to provide three dimensional data acquisition with orthogonal composite structured light patterns for structured light illuminated vision.

FIG. 5 illustrates components of a scheme to provide three dimensional data acquisition with orthogonal composite structured light patterns for structured light illuminated vision, arranged in accordance with at least some embodiments described herein.

As shown in a first diagram 500 that depicts how a composite PMP pattern may be generated using OFDM techniques, N different PMP patterns 502, which may be similar to the multiple PMP patterns 202, may be processed by an N by N IFFT block 504, as described above in FIG. 4. For example, the IFFT block 504 may process each of the PMP patterns 502 based on a center frequency $f_0$ and a respective one of N orthogonal subcarriers spaced apart by $\Delta f$, as described above. The N processed PMP patterns may then be combined via a parallel-to-serial converter 506, which may be a multiplexer or summing device, to form one or more composite PMP patterns 510, which may be denoted as $I^P(x,y)$. The composite PMP patterns 510 may then be projected toward a surface or object (for example, as a structured light pattern). The surface or object may reflect and phase-distort the composite PMP patterns 510 according to its surface topology variations, in effect applying a pixel-wise phase distortion 512 denoted by $\varphi(x,y)$ to form a reflected composite pattern image 514, which may be denoted as $I_{CP}(x,y)$, that may then be captured by a camera.

According to a second diagram 550 that depicts how a reflected composite PMP pattern may be decoded, the reflected composite pattern image 514 may be provided to a serial-to-parallel converter 552, such as a de-multiplexer, to form N phase-distorted modulated PMP patterns that may then be processed by an N by N FFT block 554. The FFT block 554 may process each of the phase-distorted modulated PMP patterns based on the center frequency $f_0$ and a respective one of N orthogonal subcarriers spaced apart by $\Delta f$, similar to IFFT block 504, to recover N phase-distorted PMP patterns 556. The recovered PMP patterns 556 may then be provided to a pixel-wise phase detection module 558, which may be configured to compute a pixel-wise phase distortion 560 associated with each of the PMP patterns 556. The computed pixel-wise phase distortion 560 may then be provided to a pixel-wise depth generation module 562, which may be configured to generate object height data 564 based on the computed pixel-wise phase distortion 260. For example, the pixel-wise depth generation module may be configured to compute a length $\overline{BC}$ between two virtual points and a height h, as described above in FIG. 3.

Figure 6:
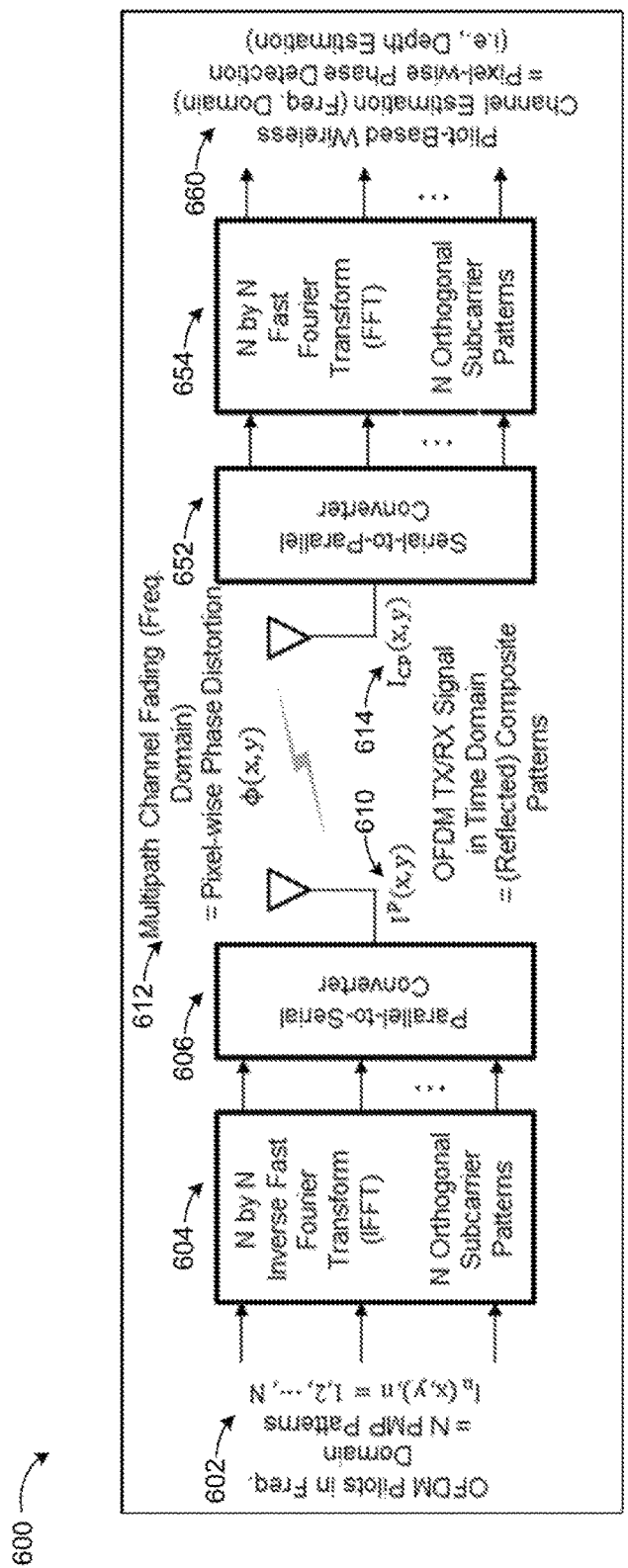
FIG. 6 illustrates how OFDM-based composite structured light pattern generation and decoding may be similar to OFDM-based wireless communications systems.

FIG. 6 illustrates how OFDM-based composite structured light pattern generation and decoding may be similar to OFDM-based wireless communications systems.

As shown in a diagram 600, PMP patterns 602 may be processed by an N by N IFFT block 604, combined via a parallel-to-serial converter 606 to form a composite PMP pattern 610, which may be denoted as $I^P(x,y)$, and then projected. A reflected composite pattern image 614, denoted as $I_{CP}(x,y)$ and formed by a combination of the composite PMP pattern 610 and pixel-wise phase distortion 612, may then be received and provided to a serial-to-parallel converter 652. The converter 652 may then convert the reflected composite pattern image 614 to N phase-distorted modulated PMP patterns, which may then be first processed by an N by N FFT block 554 and then subject to pixel-wise phase detection, as described above.

In OFDM-based wireless communications, multipath fading may cause channel gain fluctuations in the frequency domain, and in order to decode the data transmitted by each subcarrier, channel gain in the frequency domain should be estimated using pilot signals in the subcarriers, where a pilot signal may be a predefined signal known at both the transmitter and the receiver. The OFDM-based composite PMP pattern generation and decoding described herein may be similar. For example, the composite PMP pattern 610 and the reflected composite pattern image 614 may correspond to wireless OFDM time-domain transmitted and received communications signals and the pixel-wise phase distortion 612 may correspond to multipath channel fading of the wireless OFDM communications signals. Moreover, the PMP patterns 602 may correspond to OFDM wireless communication pilot signals, and pixel-wise phase detection as described herein may correspond to pilot-based wireless channel estimation in OFDM wireless communications.

Figure 7:
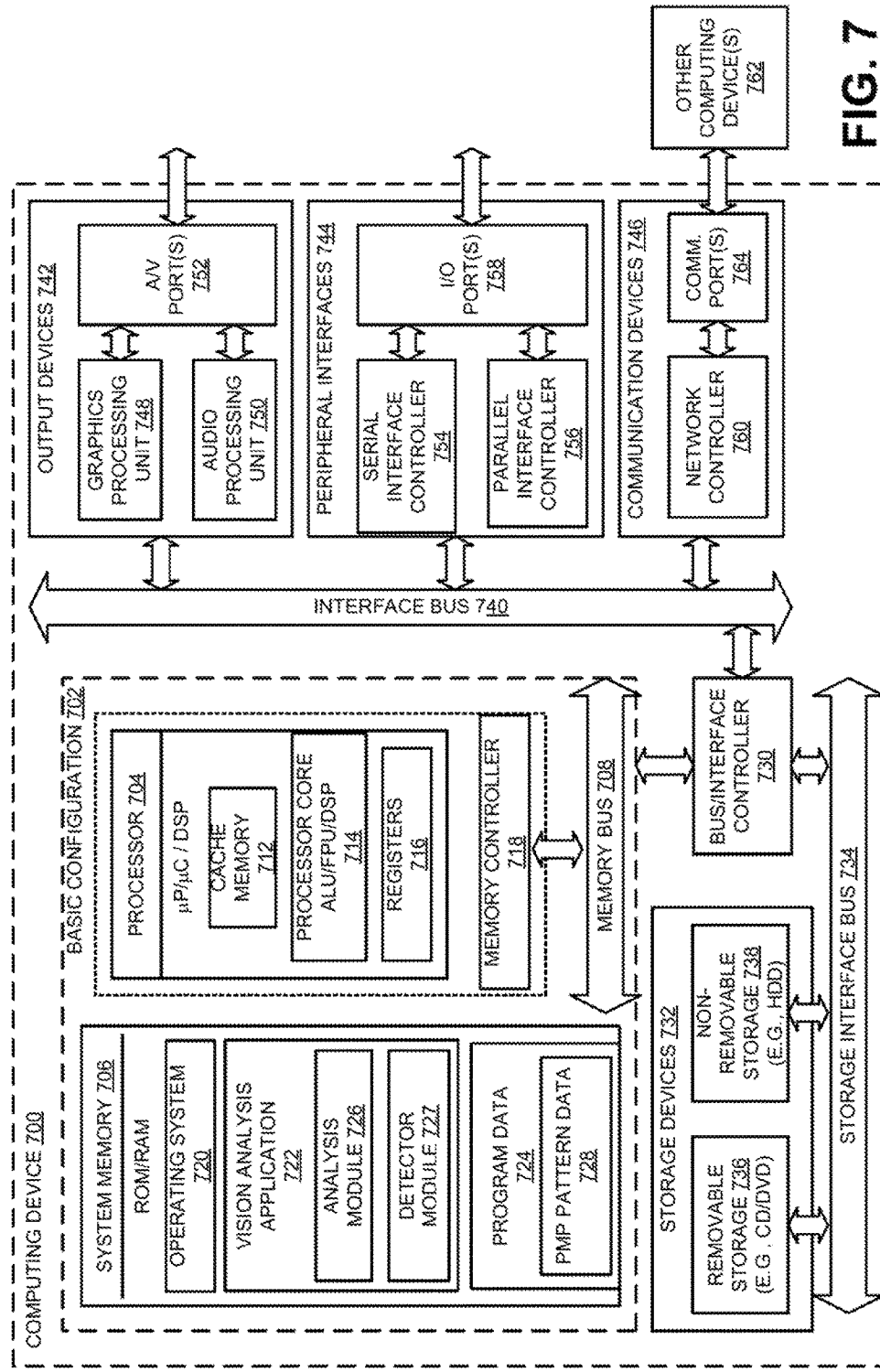
FIG. 7 illustrates a general purpose computing device, which may be used to implement three dimensional data acquisition with orthogonal composite structured light patterns for structured light illuminated vision.

FIG. 7 illustrates a general purpose computing device, which may be used to implement three dimensional data acquisition with orthogonal composite structured light patterns for structured light illuminated vision, arranged in accordance with at least some embodiments described herein.

For example, the computing device 700 may be used to determine three dimensional data about an object using OFDM-based phase measurement profilometry as described herein. In an example basic configuration 702, the computing device 700 may include one or more processors 704 and a system memory 706. A memory bus 708 may be used to communicate between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a cache memory 712, a processor core 714, and registers 716. The example processor core 714 may include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a vision analysis application 722, and program data 724. The vision analysis application 722 may include an analysis module 726 configured to generate three dimensional data about an object from structured light patterns, and a detector module 727 configured to receive structured light patterns reflected from the object, as described herein. The program data 724 may include, among other data, phase measuring profilometry (PMP) pattern data 728 or the like, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more storage devices 732 (e.g., data storage devices) via a storage interface bus 734. The storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDD), optical disk drives such as compact disc (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (e.g., one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (e.g., keyboard, mouse, pen, voice input device, touch input device, etc.) or other peripheral devices (e.g., printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers at a datacenter, customer equipment, and comparable devices.

The network communication link may be one example of a communication media. Communication media may be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Figure 8:
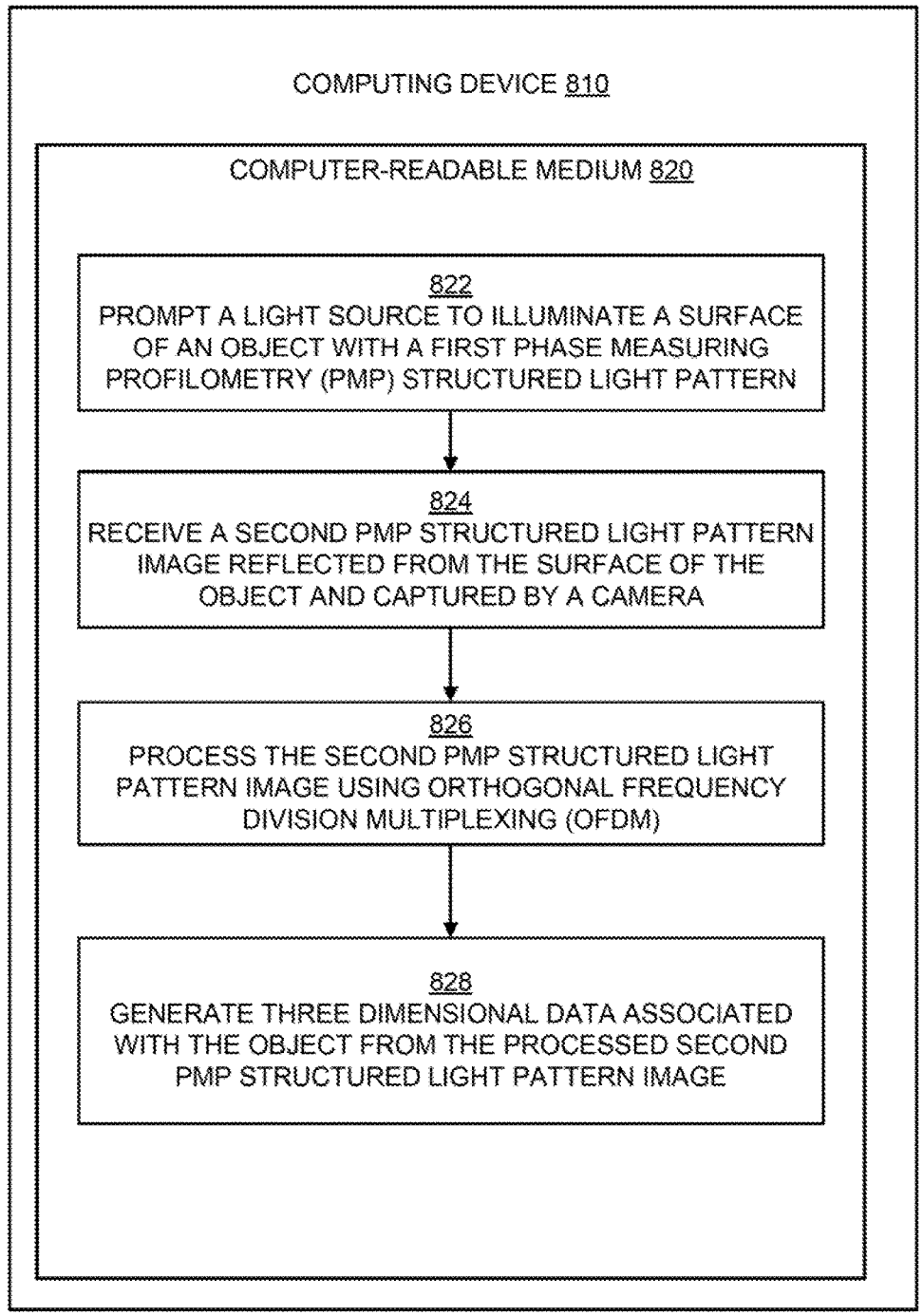
FIG. 8 is a flow diagram illustrating an example process to implement three dimensional data acquisition with orthogonal composite structured light patterns for structured light illuminated vision that may be performed by a computing device such as the computing device in FIG. 6.

FIG. 8 is a flow diagram illustrating an example process to implement three dimensional data acquisition with orthogonal composite structured light patterns for structured light illuminated vision that may be performed by a computing device such as the computing device in FIG. 7, arranged in accordance with at least some embodiments described herein.

Example methods may include one or more operations, functions or actions as illustrated by one or more of blocks 822, 824, 826, and/or 828, and may in some embodiments be performed by a computing device such as the computing device 800 in FIG. 8. The operations described in the blocks 822-828 may also be stored as computer-executable instructions in a computer-readable medium such as a computer-readable medium 820 of a computing device 810.

An example process to mask memory deduplication at a datacenter may begin with block 822, "PROMPT A LIGHT SOURCE TO ILLUMINATE A SURFACE OF AN OBJECT WITH A FIRST PHASE MEASURING PROFILOMETRY (PMP) STRUCTURED LIGHT PATTERN", where a vision analysis application may generate a structured light pattern including a composite PMP pattern with multiple modulated PMP patterns formed using OFDM techniques as described above and provide the structured light pattern to a light source for use in illuminating an object surface. For example, the vision analysis application may form the multiple modulated PMP patterns by processing PMP patterns using an inverse fast Fourier transformation, as described above.

Block 822 may be followed by block 824, "RECEIVE A SECOND PMP STRUCTURED LIGHT PATTERN IMAGE REFLECTED FROM THE SURFACE OF THE OBJECT AND CAPTURED BY A CAMERA", where the vision analysis application may receive a reflected PMP structured light pattern image that encodes topology variations of the object surface as phase distortions of the modulated PMP patterns within the reflected PMP structured light pattern, as described above.

Block 824 may be followed by block 826, "PROCESS THE SECOND PMP STRUCTURED LIGHT PATTERN IMAGE USING ORTHOGONAL FREQUENCY DIVISION MULTIPLEXING (OFDM)", where the vision analysis module may extract multiple phase-distorted modulated PMP patterns from the reflected PMP structured light pattern image. For example, the vision analysis module may extract phase-distorted modulated PMP patterns from a parallelized version of the reflected PMP structured light pattern image using a fast Fourier transformation, as described above.

Block 826 may be followed by block 828, "GENERATE THREE DIMENSIONAL DATA ASSOCIATED WITH THE OBJECT FROM THE PROCESSED SECOND PMP STRUCTURED LIGHT PATTERN IMAGE", where the vision analysis module may extract phase distortions from the phase-distorted modulated PMP patterns and use the extracted phase distortions to determine three-dimensional data (for example, height) associated with the object, as described above. For example, the vision analysis module may generate a computed pixel-wise phase distortion and use geometric algorithms to calculate pixel-wise height data for the object, as described above.

Figure 9:
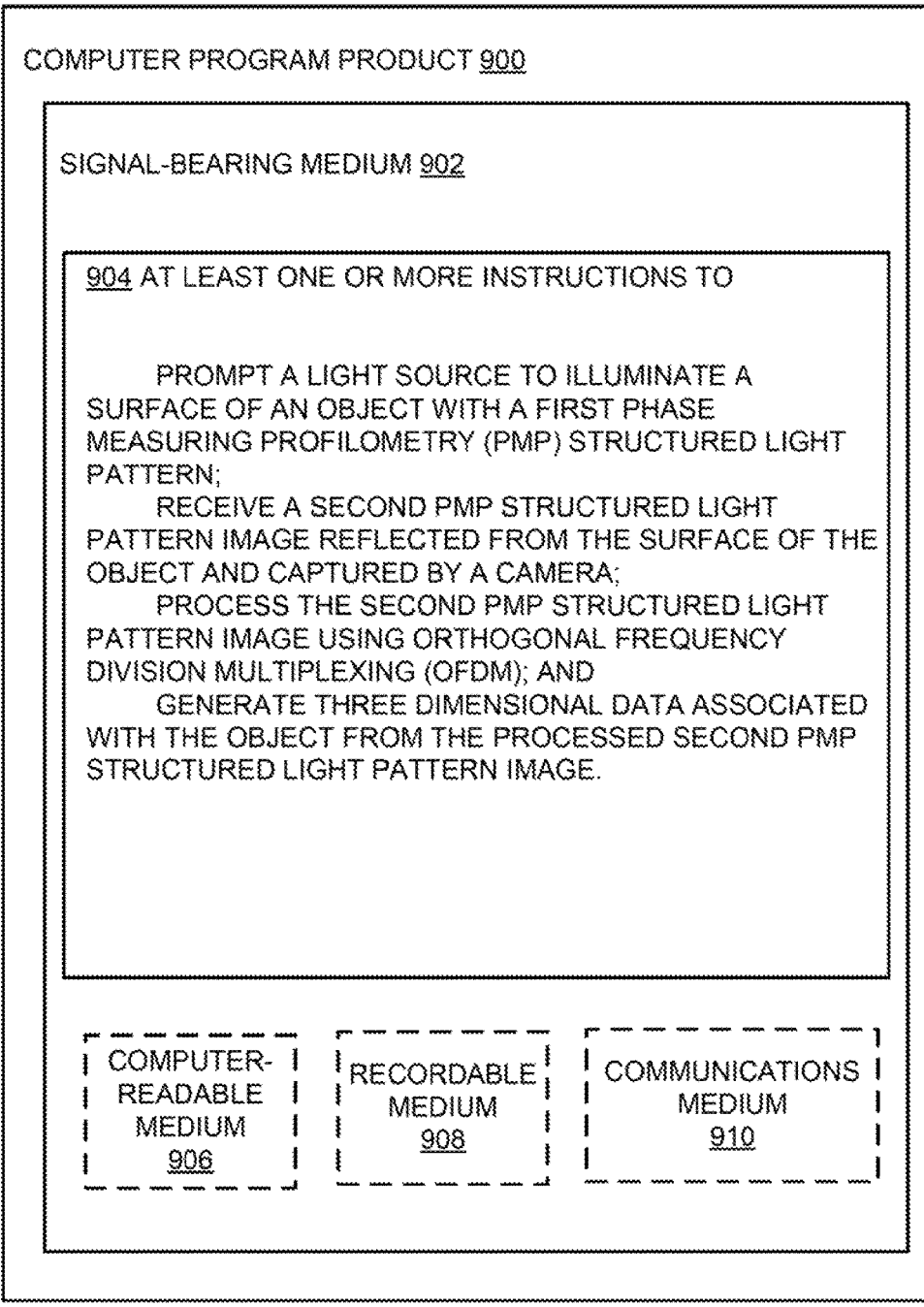
FIG. 9 illustrates a block diagram of an example computer program product to provide three dimensional data acquisition with orthogonal composite structured light patterns for structured light illuminated vision, all arranged in accordance with at least some embodiments described herein.

FIG. 9 illustrates a block diagram of an example computer program product to provide three dimensional data acquisition with orthogonal composite structured light patterns for structured light illuminated vision, In some examples, as shown in FIG. 9, a computer program product 900 may include a signal bearing medium 902 that may also include one or more machine readable instructions 904 that, when executed by, for example, a processor may provide the functionality described herein. Thus, for example, referring to the processor 704 in FIG. 7, the vision analysis application 722 may undertake one or more of the tasks shown in FIG. 9 in response to the instructions 904 conveyed to the processor 704 by the medium 902 to perform actions associated with determining three-dimensional data about an object as described herein. Some of those instructions may include, for example, instructions to prompt a light source to illuminate a surface of an object with a first phase measuring profilometry (PMP) structured light pattern, receive a second PMP structured light pattern image reflected from the surface of the object and captured by a camera, process the second PMP structured light pattern image using orthogonal frequency division multiplexing (OFDM), and/or generate an image from the processed second PMP structured light pattern, where the image includes three dimensional data associated with the object, according to some embodiments described herein.

In some implementations, the signal bearing media 902 depicted in FIG. 9 may encompass computer-readable media 906, such as, but not limited to, a hard disk drive, a solid state drive, a compact disk (CD), a digital versatile disk (DVD), a digital tape, memory, etc. In some implementations, the signal bearing media 902 may encompass recordable media 907, such as, but not limited to, memory, read/write (R/W) CDs, R/W DVDs, etc. In some implementations, the signal bearing media 902 may encompass communications media 910, such as, but not limited to, a digital and/or an analog communication medium (e.g., a fiber optic cable, a waveguide, a wired communications link, a wireless communication link, etc.). Thus, for example, the program product 900 may be conveyed to one or more modules of the processor 704 by an RF signal bearing medium, where the signal bearing media 902 is conveyed by the wireless communications media 910 (e.g., a wireless communications medium conforming with the IEEE 802.11 standard).

According to some examples, a computing device capable to provide three dimensional data acquisition with orthogonal composite patterns for structured light illumination vision is provided. The computing device may include a networking component, a memory, and one or more processors. The memory may be configured to store instructions associated with a vision analysis application. The processors may be capable to execute the vision analysis application in conjunction with instructions stored in the memory. The vision analysis application may include a detector module and an analysis module. The detector module may be configured to prompt, through the networking component, a light source to illuminate a surface of an object with a first structured light pattern, and receive, through the networking component, a second structured light pattern image reflected from the surface of the object. The analysis module may be configured to process the second structured light pattern image using orthogonal frequency division multiplexing (OFDM) and generate three dimensional data associated with the object from the processed second structured light pattern image.

According to some embodiments, the analysis module may be further configured to identify the second structured light pattern image as including one or more phase measuring profilometry (PMP) patterns and/or process the second structured light pattern image using a fast fourier transform (FFT) scheme and/or an inverse fast fourier transform (IFFT) scheme. The analysis module may be further configured to detect a phase distortion associated with a point on the surface of the object associated with the second structured light pattern image and/or compute a height of the object by applying a geometric scheme to the phase distortion associated with the point on the surface of the object. According to other embodiments, the analysis module may be further configured to determine an orthogonal dimension for the first structured light pattern and generate multiple modulated phase measuring profilometry (PMP) patterns based on the orthogonal dimension and an IFFT scheme, generate the first structured light pattern by processing the modulated PMP patterns with a parallel-to-serial converter, and/or provide the first structured light pattern to the light source.

According to some embodiments, the second structured light pattern image may include a reflected composite pattern image of the object, the image including a combination of one or more phase distortions and the multiple modulated PMP patterns. The analysis module may be further configured to process the reflected composite pattern image of the object through a serial-to-parallel converter and an FFT scheme to de-multiplex the reflected composite pattern image of the object to recover the phase distortion(s) and the modulated PMP pattern(s). The analysis module may be further configured to process the phase distortion(s) using a geometric scheme to compute height data associated with one or more points on the surface of the object, where the points correspond to points illuminated by the first structured light pattern. In some embodiments, the analysis module may be further configured to generate the three dimensional data associated with the object based on the height data.

According to other examples, a method to provide three dimensional data acquisition with orthogonal composite patterns for structured light illumination vision is provided. The method may include prompting a light source to illuminate a surface of an object with a first phase measuring profilometry (PMP) structured light pattern, receiving a second PMP structured light pattern image reflected from the surface of the object, processing the second PMP structured light pattern image using orthogonal frequency division multiplexing (OFDM), and generating three dimensional data associated with the object from the processed second PMP structured light pattern image.

According to some embodiments, the method may further include detecting, from the processed second PMP structured light pattern image, a phase distortion associated with a point on the surface of the object, and computing a height of the object by applying a geometric scheme to the phase distortion. The method may further include determining an orthogonal dimension for the first PMP structured light pattern and generating multiple modulated PMP patterns based on the orthogonal dimension and an inverse fast fourier transform (IFFT) scheme. The method may further include processing the multiple modulated PMP patterns with a parallel-to-serial converter to generate the first PMP structured light pattern.

According to other embodiments, the second PMP structured light pattern image may include a reflected composite pattern image of the object, and the method may further include processing the reflected composite pattern image of the object through a serial-to-parallel converter and a fast fourier transform (FFT) scheme to de-multiplex the reflected composite pattern image of the object into multiple phase-distorted modulated PMP patterns. The method may further include processing the phase-distorted modulated PMP patterns using a geometric scheme to compute height data associated with one or more points on the surface of the object, where the point(s) are associated with the reflected second PMP structured light pattern image, and generating the three dimensional data associated with the object using the height data.

According to further examples, an object detection system capable to provide three dimensional data acquisition with orthogonal composite patterns for structured light illuminated vision is provided. The object detection system may include a camera, a light source, a memory configured to store instructions associated with a vision analysis application, and one or more processors coupled to the memory and capable to execute the vision analysis application. The vision analysis application may be configured to prompt the light source to illuminate a surface of an object with a first phase measuring profilometry (PMP) structured light pattern and receive a second PMP structured light pattern image reflected from the surface of the object and captured by the camera. The vision analysis application may further be configured to process the second PMP structured light pattern image using orthogonal frequency division multiplexing (OFDM) and generate three dimensional data associated with the object from the processed second PMP structured light pattern image.

According to some embodiments, the vision analysis application may be further configured to generate multiple modulated PMP patterns based on an orthogonal dimension and an inverse fast fourier transform (IFFT) scheme, and process the modulated PMP patterns using a parallel-to-serial converter to generate the first PMP structured light pattern. The second PMP structured light pattern image may include a reflected composite pattern image of the object, and the vision analysis application may be further configured to process the reflected composite pattern image of the object through a serial-to-parallel converter and a fast fourier transform (FFT) scheme to de-multiplex the reflected composite pattern image of the object into multiple phase-distorted modulated PMP patterns. The vision analysis application may also be configured to process the multiple phase-distorted modulated PMP patterns with a geometric scheme to compute height data associated with one or more points on the surface of the object, where the point(s) on the surface of the object are associated with the reflected second PMP structured light pattern, and generate the three dimensional data associated with the object using the height data.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via application specific integrated circuits (ASICs), field programmable gate arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs executing on one or more computers (e.g., as one or more programs executing on one or more computer systems), as one or more programs executing on one or more processors (e.g., as one or more programs executing on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a compact disc (CD), a digital versatile disk (DVD), a digital tape, a computer memory, a solid state drive, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a data processing system may include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity of gantry systems; control motors to move and/or adjust components and/or quantities).

A data processing system may be implemented utilizing any suitable commercially available components, such as those found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than,"

"less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A computing device capable to provide three dimensional data acquisition with orthogonal composite patterns for structured light illuminated vision, the computing device comprising:
    a networking component;
    a memory configured to store instructions associated with a vision analysis application; and
    one or more processors coupled to the memory and the networking component, wherein the one or more processors are capable to execute the vision analysis application in conjunction with the instructions stored in the memory, and wherein the vision analysis application includes:
        a detector module configured to:
            prompt, through the networking component, a light source to illuminate a surface of an object with a first structured light pattern, wherein the first structured light pattern comprises a plurality of phase measuring profilometry (PMP) structured light patterns modulated with a single carrier pattern, wherein the single carrier pattern includes multiple subcarrier patterns, and wherein the modulation of the plurality of PMP structured light patterns with the single carrier pattern is based on a single center frequency of the single carrier pattern and a subcarrier spacing between two different subcarriers of the single carrier pattern; and
            receive, through the networking component, a second structured light pattern image returned from the surface of the object; and
        an analysis module configured to:
            process the second structured light pattern image by use of orthogonal frequency division multiplexing (OFDM),
            wherein the analysis module is configured to process the second structured light pattern image, by use of the OFDM, is based on the single center frequency and the subcarrier spacing; and
            generate three dimensional data associated with the object from the processed second structured light pattern image.

2. The computing device of claim 1, wherein the analysis module is further configured to:
    identify the second structured light pattern image as including the plurality of PMP structured light patterns modulated with the single carrier pattern.

3. The computing device of claim 1, wherein the analysis module is further configured to:
    process the second structured light pattern image by use of one or more of: a fast Fourier transform (FFT) scheme or an inverse fast Fourier transform (IFFT) scheme.

4. The computing device of claim 1, wherein the analysis module is further configured to:
    detect a phase distortion associated with a point on the surface of the object.

5. The computing device of claim 4, wherein the analysis module is further configured to:
    compute a height of the object by application of a geometric scheme to the phase distortion associated with the point on the surface of the object.

6. The computing device of claim 1, wherein:
    the analysis module is further configured to determine an orthogonal dimension for the first structured light pattern, and
    the modulation of the plurality of PMP structured light patterns with the single carrier pattern, to generate a plurality of modulated PMP structured light patterns, is further based on the orthogonal dimension and an inverse fast Fourier transform (IFFT) scheme.

7. The computing device of claim 6, wherein the analysis module is further configured to:
    generate the first structured light pattern by processing the plurality of modulated PMP structured light patterns with a parallel-to-serial converter; and
    provide the first structured light pattern to the light source.

8. The computing device of claim 7, wherein the second structured light pattern image includes a returned composite pattern image of the object, and wherein the returned composite pattern image includes a combination of one or more phase distortions and the plurality of modulated PMP structured light patterns.

9. The computing device of claim 8, wherein the analysis module is further configured to:
    process the returned composite pattern image of the object through a serial-to-parallel converter and a fast Fourier transform (FFT) scheme to de-multiplex the returned composite pattern image of the object to recover the one or more phase distortions and the plurality of modulated PMP structured light patterns.

10. The computing device of claim 9, wherein the analysis module is further configured to:
    process the one or more phase distortions by use of a geometric scheme to compute height data associated with one or more points on the surface of the object, wherein the one or more points on the surface of the object correspond to points illuminated by the first structured light pattern.

11. The computing device of claim 10, wherein the analysis module is further configured to:
    generate the three dimensional data associated with the object based on the height data.

12. A method to provide three dimensional data acquisition with orthogonal composite patterns for structured light illuminated vision, the method comprising:
    prompting a light source to illuminate a surface of an object with a first phase measuring profilometry (PMP) structured light pattern, wherein the first PMP structured light pattern includes a plurality of PMP structured light patterns modulated with a single carrier pattern, wherein the single carrier pattern includes multiple subcarrier patterns, and wherein the modulation of the plurality of PMP structured light patterns with the single carrier pattern is based on a single center frequency of the single carrier pattern and a subcarrier spacing between two different subcarriers of the single carrier pattern;

receiving a second PMP structured light pattern image returned from the surface of the object;

processing the second PMP structured light pattern image using orthogonal frequency division multiplexing (OFDM), wherein processing the second PMP structured light pattern image by use of the OFDM is based on the single center frequency and the subcarrier spacing; and generating three dimensional data associated with the object from the processed second PMP structured light pattern image.

13. The method of claim 12, further comprising:

detecting, from the processed second PMP structured light pattern image, a phase distortion associated with a point on the surface of the object; and computing a height of the object by applying a geometric scheme to the phase distortion.

14. The method of claim 12, further comprising:

determining an orthogonal dimension for the first PMP structured light pattern, wherein the modulation of the plurality of PMP structured light patterns with the single carrier pattern, to generate a plurality of modulated PMP structured light patterns, is further based on the orthogonal dimension and an inverse fast Fourier transform (IFFT) scheme.

15. The method of claim 14, further comprising:

processing the plurality of modulated PMP structured light patterns with a parallel-to-serial converter to generate the first PMP structured light pattern.

16. The method of claim 15, wherein the second PMP structured light pattern image includes a returned composite pattern image of the object, and wherein the method further comprises:

processing the returned composite pattern image of the object through a serial-to-parallel converter and a fast Fourier transform (FFT) scheme to de-multiplex the returned composite pattern image of the object into a plurality of phase-distorted modulated PMP patterns.

17. The method of claim 16, further comprising:

processing the plurality of phase-distorted modulated PMP patterns by use of a geometric scheme to compute height data associated with one or more points on the surface of the object, wherein the one or more points are associated with the reflected second PMP structured light pattern image; and generating the three dimensional data associated with the object by use of the height data.

18. An object detection system capable to provide three dimensional data acquisition with orthogonal composite patterns for structured light illuminated vision, the object detection system comprising:

a camera;

a light source;

a memory configured to store instructions associated with a vision analysis application; and one or more processors coupled to the memory, wherein the one or more processors are capable to execute the vision analysis application, and wherein the vision analysis application is configured to:

prompt the light source to illuminate a surface of an object with a first phase measuring profilometry (PMP) structured light pattern, wherein the first PMP structured light pattern comprises a plurality of PMP structured light patterns modulated with a single carrier pattern, wherein the single carrier pattern includes multiple subcarrier patterns, and wherein the modulation of the plurality of PMP structured light patterns with the single carrier pattern is based on a single center frequency of the single carrier pattern and a subcarrier spacing between two different subcarriers of the single carrier pattern;

receive a second PMP structured light pattern image returned from the surface of the object and captured by the camera;

process the second PMP structured light pattern image by use of orthogonal frequency division multiplexing (OFDM), wherein vision analysis application is configured to process the second PMP structured light pattern image, by use of the OFDM, based on the single center frequency and the subcarrier spacing; and generate three dimensional data associated with the object from the processed second PMP structured light pattern image.

19. The object detection system of claim 18, wherein the modulation of the plurality of PMP structured light patterns with the single carrier pattern, to generate a plurality of modulated PMP structured light patterns, is further based on an orthogonal dimension and an inverse fast Fourier transform (IFFT) scheme, and wherein the vision analysis application is further configured to process the plurality of modulated PMP structured light patterns by use of a parallel-to-serial converter to generate the first PMP structured light pattern.

20. The object detection system of claim 19, wherein the second PMP structured light pattern image includes a returned composite pattern image of the object, and wherein the vision analysis application is further configured to:

process the returned composite pattern image of the object through a serial-to-parallel converter and a fast Fourier transform (FFT) scheme to de-multiplex the returned composite pattern image of the object into a plurality of phase-distorted modulated PMP patterns;

process the plurality of phase-distorted modulated PMP patterns with a geometric scheme to compute height data associated with one or more points on the surface of the object, wherein the one or more points on the surface of the object are associated with the second PMP structured light pattern image; and generate the three dimensional data associated with the object by use of the height data.

* * * * *

UNITED STATES PATENT AND TRADEMARK OFFICE
CERTIFICATE OF CORRECTION

Page 1 of 1

PATENT NO. : 10,037,612 B2
APPLICATION NO. : 14/980692
DATED : July 31, 2018
INVENTOR(S) : Kwak et al.

It is certified that error appears in the above-identified patent and that said Letters Patent is hereby corrected as shown below:

In the Claims

In Column 19, Line 47, please delete "the reflected second" and insert -- the second -- therefor.

Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*